United States Patent Office 3,557,044
Patented Jan. 19, 1971

3,557,044
PROCESS FOR MAKING SPANDEX POLYMERS
James L. Bleasdale and Carl L. Sandquist, Waynesboro, Va., assignors to E. I. du Pont de Nemours and Company, Wilmington, Del., a corporation of Delaware
No Drawing. Continuation-in-part of application Ser. No. 290,905, June 27, 1963, which is a continuation-in-part of application Ser. No. 200,669, June 7, 1962. This application June 9, 1967, Ser. No. 644,804
Int. Cl. C08g 51/44, 22/16, 22/04
U.S. Cl. 260—32.6       11 Claims

ABSTRACT OF THE DISCLOSURE

Spandex polymers which have low intrinsic viscosities and which can thus be spun from solutions at high solids concentrations, but which result in yarns having high intrinsic viscosities and correspondingly good physical properties can be produced. An aromatic diisocyanate is reacted with a difunctional hydroxyl- or amine-terminated linear organic polymer and the resulting isocyanate-terminated macrointermediate is chain-extended with a diamine, hydrazine or dihydrazide. A nonaromatic secondary monoamine, which acts as a chain-terminator, is also used, and the amounts of chain-terminator and chain-extender are selected from within specified limits.

CROSS REFERENCES TO RELATED APPLICATIONS

This application is a continuation-in-part of our application Ser. No. 290,905, filed June 27, 1963, which is in turn a continuation-in-part of our application Ser. No. 200,669, filed June 7, 1962, both now abandoned.

BACKGROUND OF THE INVENTION

Field of the invention

This invention relates to elastomeric products formed by reaction of organic diisocyanates and compounds containing hydrogen reactive with isocyanate groups. More particularly, it relates to the preparation of linear segmented elastomers by the reaction of difunctional isocyanate-terminated macrointermediates with difunctional and monofunctional active hydrogen-containing compounds.

Description of the prior art

It is known that linear segmented polymers may be prepared from isocyanate-terminated polymeric intermediates and active hydrogen-containing compounds and that they may be shaped into highly elastic filaments. For example, linear segmented elastomers from low melting polyether glycols, organic diisocyanates, and organic primary diamines are described in U.S. Pat. No. 2,929,804. In U.S. Pat. No. 2,957,852 are described linear segmented polymers from various types of isocyanate-terminated polymeric intermediates and hydrazine. Elastic filaments from a certain class of such polymers are termed "spandex," which refers to a manufactured fiber in which at least 85% of the fiber-forming substance is a segmented polyurethane.

While the known processes for preparing the linear segmented polymers provide polymers which may be spun into fibers having highly desirable physical properties, such fibers have generally been obtained only from polymers having high intrinsic viscosities, e.g., above about 1.5. These high intrinsics severely limit the solids level which may be used in solution spinning. Spinning speeds must then be kept low to spin the attendant low-solids polymer solution. Attempts to reduce the polymer intrinsic viscosity without an appreciable loss in physical properties have heretofore been unsuccessful.

SUMMARY OF THE INVENTION

According to this invention there is provided a method for preparing superior spandex polymers which may be spun into elastic filaments at high spinning speeds. Further there is provided a method for reproducibly preparing spandex polymers of high quality in a continuous polymerization process.

The invention is a process for preparing a segmented polymer having an intrinsic viscosity as measured in hexamethylphosphoramide at 25° C. in the range of about 0.6 to about 1.3, by the reaction of a difunctional isocyanate-terminated macrointermediate having a number-average molecular weight M with difunctional and monofunctional hydrogen-containing compounds having hydrogen reactive with isocyanate groups, which comprises using said difunctional and monofunctional compounds in amounts such that (a) the mol percentage of said monofunctional compound is in the range from about $0.00328 \times M \times (\eta)^{-2.224}$ to about $0.0068 \times M \times (\eta)^{-2.224}$, and
(b) the mol percentage of said difunctional compound is substantially equal to $100 + (0.0034 \times M \times (\eta)^{-2.224})$ minus said mol percentage of monofunctional compound, wherein $(\eta)$ is said intrinsic viscosity and M is said molecular weight, and wherein all mol percentages are based on the total mols of difunctional isocyanate present.

DETAILED DESCRIPTION

For the preparation of the isocyanate-terminated macrointermediate, a polymer having terminal groups containing active hydrogen is reacted with a molar excess of an organic diisocyanate.

The reaction product, containing unreacted organic diisocyanate as well as isocyanate-terminated polymeric intermediates, is referred to herein as an isocyanate-terminated macrointermediate or prepolymer. The polymer having terminal groups containing active hydrogen should have a molecular weight of at least about 600. While the molecular weight may be as high as 5000, it is generally preferred that it be in the range between 1000 and 3000. The macrointermediate is then "chain-extended" with a difunctional active hydrogen-containing compound in the presence of a monofunctional active hydrogen-containing compound to form the segmented polymer. The starting polymers having terminal groups with active hydrogen may be of a variety of types as disclosed in U.S. Pat. No. 2,957,852. For example, the polymer may be a polyether, a polyester, a polyurethane, a polysulfide, or a polysiloxane. The end groups will generally be hydroxyl (—OH), but amine end groups (—NH₂) may also be used. The preferred polymer is a polyether with hydroxyl end groups. The organic diisocyanate should be an aromatic diisocyanate, i.e., the —NCO groups should be directly attached to aromatic rings. In particular, p,p'-methylenediphenyl diisocyanate is preferred.

In the reaction of the isocyanate-terminated macrointermediate with the active hydrogen-containing compounds, it has been found that superior polymers and solutions thereof are obtained if the process is operated with a slight excess of the active hydrogen-containing compounds over that required for stoichiometry. Advantages of operation with excess active hydrogen compounds rather than with excess diisocyanate include elimination of bubble formation in the solution (resulting from the reaction of small amounts of water with the excess isocyanate), thereby permitting immediate spinning thereof, as well as improved solution viscosity stability and color stability.

The types of difunctional active hydrogen compounds, also referred to herein as "chain extenders," which are suitable for chain extension, include the diamines, hydrazines, and dihydrazides. The preferred chain extenders are the organic diamines and the hydrazines. The hydrazines which are suitable for chain extension are described in U.S. Pat. No. 2,957,852. The preferred hydrazine compound is unsubstituted hydrazine, $N_2H_4$. The organic diamines which are suitable for chain extension are preferably the diprimary diamines as described in U.S. Pat. No. 2,929,804, e.g., ethylenediamine, trimethylenediamine, tetramethylenediamine, metaxylylenediamine, 1,3-cyclohexylenediamine, mixtures of ethylenediamine and 1,3-cyclohexylenediamine, and mixtures of ethylenediamine and N-methyliminobispropylamine as described in U.S. Pat. No. 3,180,853. Suitable dihydrazine chain-extenders include carbohydrazide and the dihydrazides described in German Pat. No. 1,123,467.

The monofunctional compound, also referred to herein as "chain terminator," is a secondary monoamine. This class of compounds has one hydrogen atom attached to nitrogen, the remaining valences of the nitrogen being satisfied by aliphatic or cycloaliphatic radicals. The aliphatic or cycloaliphatic radicals may contain atoms other than carbon and hydrogen. Heterocyclic secondary amines are also suitable. Suitable chain terminators include diethylamine, diisopropylamine, tert-butylethylamine, cyclohexylethylamine, piperidine, N-methylpiperazine, ethyleneimine, diethanolamine, di-n-propylamine, di-isobutylamine, di-n-butylamine, dicyclohexylamine, N-tert-butylethanolamine, morpholine, 2,6-dimethylmorpholine and iminodiacetonitrile.

As previously stated, the advantages of this invention are attained with polymers having intrinsic viscosities in the range of 0.6 to 1.3 when the mol percentage of chain terminator is in the range $0.00328 \times M \times (\eta)^{-234}$ to $0.0068 \times M \times (\eta)^{-2.224}$. This means that for an isocyanate-terminated macrointermediate having a molecular weight of 2500, the mol percentage of monofunctional compound based on the mols of diisocyanate may be as low as about 4.5% for an intrinsic viscosity of 1.3 and as high as about 53% for an intrinsic viscosity of 0.6. While the prior art teaches the use of very small amounts of chain terminator, it is surprising to find that superior fibers are obtained using amounts of monofunctional compound in excess of the amounts suggested by the prior art.

In the ranges specified above, the mol percentage of chain terminator, e.g., diethylamine, is based on the mols of diisocyanate present in the mixture at the time of addition of the chain terminator. The mols of diisocyanate present will comprise the mols of difunctional isocyanate-terminated polymeric intermediates, as well as the mols of any unreacted diisocyanate which is added to or remains in the reaction mixture. The mols of diisocyanate present may be calculated by dividing the weight of isocyanate-terminated macrointermediate used (or, alternatively, the sum of the weights of organic diisocyanate and polymer having terminal groups containing active hydrogen) by the number-average molecular weight M.

The number-average molecular weight M of the isocyanate-terminatedmediate is determined by isocyanate end-group analysis. Ten to fifteen grams of the macrointermediate is weighed to the nearest milligram into a flask containing 50 ml. dry chlorobenzene and 10.00 ml. of 2 N di-n-butylamine. The flask is shaken to dissolve the sample, and it is then titrated to a bromophenol blue end point with 0.5 N methanolic HCl. A blank consisting of 50 ml. chlorobenzene and 10.00 ml. di-n-butylamine is also titrated to a bromophenol blue end point. Number-average molecular weight, assuming difunctionality of the macrointermediate, is calculated from the following equation $$M = \frac{(2000)(W)}{(B-S)(\text{normality of HCl})}$$

where W is the weight of the sample, B is the ml. of HCl required to titrate the blank, and S is the ml. of HCl required to titrate the sample.

In the practice of this invention, the intrinsic viscosity is regulated by controlling the amounts of active hydrogen compounds which react with isocyanate, that is, the difunctional chain extender and the monofunctional chain terminator. Once the mol percentage of chain terminator is selected in accordance with the discussion in the preceding paragraphs, the amount of chain extender to be used is then determined in accordance with the following equation:

mol percentage of chain extender $= 100 + (0.0034 \times M \times (\eta)^{-2.224})$ — mol percentage of chain terminator As before, the mol percentage is based on the total mols of diisocyanate present. The relationships specified herein provide for the use of at least 100 mol percent total of active hydrogen compound based on the mols of diisocyanate.

Within the limits specified for monofunctional chain terminator, the actual mol percentage may be varied in order to compensate for variations in adventitious impurities in the system, e.g., in the solvent used, which impurities function as chain terminators. By this method, viscosity of the solution is conveniently regulated. For the same reasons, it is to be understood that the amount of chain extender to be used need not be the precise amount given by the equation set forth in the preceding paragraph. The amount of chain extender used should be substantially equal to the calculated amount, but small variations therefrom are contemplated within the scope of this invention.

For process simplicity, it is desirable that the monofunctional chain terminator and difunctional chain extender be added simultaneously, but in some cases, it may be desirable to add some or all of the monofunctional chain terminator prior to the addition of the difunctional chain extender. By simultaneous addition is meant to include in a process of polymerizing an isocyanate-terminated macrointermediate, the introduction of a single stream comprising, for example, a mixture of aliphatic secondary monoamine and an aliphatic difunctional primary amine, as well as the introduction of separate streams of monoamine and diamine, at the same time, or in a continuous process, at the same position. It is understood that the addition of the monoamine and diamine streams may be made to the isocyanate-terminated macrointermediate, or vice versa.

If the monoamine reacts with the isocyanate-terminated macrointermediate at a much slower rate than the difunctional chain-extender, it is desirable to add part or all of the monoamide to the isocyanate-terminated macrointermediate prior to the addition of the chain-extender in order to make efficient use of the monoamine.

It is apparent that the process of this invention may be practiced under either batch or continuous polymerization conditions. To provide superior polymer, the preparation of the isocyanate-terminated macrointermediate as well as the chain-extension thereof must be carried out under carefully observed and accurately regulated conditions. In the preparation of the isocyanate-terminated macrointermediate, the hydroxyl-terminated polymer, e.g., the polyether glycol, and the organic diisocyanate should be quickly and thoroughly mixed before there is any appreciable reaction between them. The reagents are therefore heated to above their respective melting points so that they may be metered and mixed as liquids at the lowest possible temperature. After an intimate mixture is obtained, it is transferred to an unagitated zone in which reaction occurs. This reaction zone should be designed so that stagnant regions therein are avoided and so that no back mixing occurs from the reaction zone to the intitial mixing zone. These precautions avoid the production of gels in the polymer and avoid undesirable viscosity increases.

For metering the reagents in practicing the process of this invention, adjustable metering pumps may be used. These can be regulated by modification of stroke, number of rotations, etc. Generally speaking, any metering device may be used which permits a substantially uniform feed. In any case, the metering is done so that the ratio of the NCO groups to the OH groups is greater than 1.0, preferably from 1.3 to 2.3.

The addition of small amounts of phosphoric acid or anhydride to the polyether glycol may be used to increase the rate of reaction with the organic diisocyanate without appreciably altering the reaction product. Moreover, the addition of small amounts of phosphoric acid, phosphorus pentoxide, or benzenesulfonyl chloride during the manufacture of the segmented polymers has been found to yield products which in solution develop little color. Thus, phosphoric acid in concentrations as low as 0.02% based on the polyether glycol yields polymer solutions with good color stability.

After the isocyanate-terminated macrointermediate has been prepared, it is preferably dissolved in a suitable solvent before the chain-extension step is carried out. Substantially inert solvents, which are essentially non-reactive to isocyanate and chain-extender and which dissolve the polymer product, for example N,N-dimethylacetamide, and other solvents disclosed in U.S. Patent No. 2,957,852 are suitable. The solution of the macrointermediate is then fed to a vessel in which thorough mixing of the reagent streams may be achieved. This is the point in the process at which the chain-extender and chain terminator are added. Again, in order to achieve superior products, blending of all the reactants should be carried out before appreciable reaction takes place. If desired, for example, because of a slower reaction rate of chain terminator, the chain terminator may be added earlier in the process, such as in the dilution mixer.

After the chain-extension step has been completed, additives and photostabilizers may be blended into the solution, but the temperature should be reduced as soon as possible, in order to stabilize solution viscosity and in order to avoid formation of color. For this purpose the mixture should be cooled to less than 40° C., preferably to less than 30° C.

The solutions of linear segmented polymers obtained in the practice of this invention may be used in the conventional way for dry spinning or wet spinning elastic filaments. Spinning productivity is substantially increased through the utilization of lower molecular weight polymer at higher solution solids. With wet-spun products, it may be desirable to heat-treat the as-spun yarns, e.g., by passing them over heated rolls. Dry-spun products may also be heat-treated if desired, but this is usually not necessary to obtain good physical properties, since the yarns are exposed to sufficient heat in the spinning cell to raise the intrinsic viscosity to 1.5 or higher. The elastic filaments so produced have superior physical properties, and they find particular use in surgical stockings, foundation garments, bathing suits, sock tops and elastic garments of all types.

As used herein, intrinsic viscosity refers to the limiting value, as the concentration approaches zero, of the expression $$\frac{\eta - \eta_0}{\eta_0 c}$$

in which $\eta$ is the viscosity of a dilute solution of the polymer, $\eta_0$ is the viscosity of the solvent in the same units and at the same temperature, and $c$ is the concentration in grams of the polymer per 100 ml. of solution. The intrinsic viscosities recorded herein were measured in hexamethylphosphoramide at 25° C.

"Tensile recovery" is the percentage return to the original length within one minute after the tension has been released from a sample which has been elongated 200% at the rate of 100% per minute and held at 200% elongation for one minute. "Stress decay" is the percent loss in stress in a yarn one minute after it has been elongated to 200% at 100% per minute. "Long term tensile recovery" and "long term stress decay" refer to the corresponding properties after holding at 200% elongation for 1000 minutes.

This invention is illustrated by the following examples, in which parts are by weight unless otherwise specified. In the first five examples, properties are measured as specified in the preceding paragraph. In the other examples, a five-cycle testing procedure is used. In this procedure, samples are cycled five times from zero to 300% elongation at a rate of 1000% per minute. On the fifth cycle, the yarn is held at 300% elongation for thirty seconds before being returned to zero stress. The sample is then elongated to break. "$T_{100}$" is the retractive force in grams per effective denier at 100% elongation on the unload curve of the fifth cycle, and "$T_{200}$" is the retractive force in grams per effective denier at 200% elongation on the unload curve of the fifth cycle. Power potential "$\pi_{100}$" is defined as the product of "$T_{100}$" in grams per effective denier and the "Break Elongation" in percent.

EXAMPLE I

Into a mixer maintained at 50° C. are fed a stream of polytetramethylene ether glycol at a rate of 8 pounds per hour and a stream of liquid p,p'-methylenediphenyl diisocyanate at 2 pounds per hour. The polytetramethylene ether glycol has a molecular weight of about 2000 and is thoroughly pre-dried by treatment with a molecular sieve. The reagents are intimately mixed, remain in the mixer for one minute, and are discharged continuously into a jacketed pipeline maintained at about 96° C. and extending for 25 feet. The pipeline serves as a reactor in which the polyether glycol is "capped" with 2 mols of the diisocyanate to yield an isocyanate-terminated polyether having a molecular weight of about 2500. The average time spent in the reactor is between 90 and 100 minutes. On emerging from the pipeline reactor, the isocyanate-terminated polyether is cooled at once to below 45° C. The cooled isocyanate-terminated polyether is conducted at a rate of 9.2 pounds per hour into a high-shear mixer containing a rotating disc, and a stream of N,N-dimethylacetamide is added at 6.8 pounds per hour. The mixture (57.5% solids) is thoroughly agitated for 15 minutes and then passes to a chamber in which a mixture of hydrazine (35% in water) and diethylamine (5% in dimethylacetamide), in the ratio of 4.2 parts of hydrazine to 1 part of diethylamine, together with additional dimethylacetamide is added as a single stream at a rate of 16.5 pounds per hour with strong agitation. The diethylamine added is 10 mol percent and the hydrazine added is 96 mol percent based on isocyanate-terminated polyether. The mixture passes to a reaction chamber held at a temperature of 20° to 70° C., the contents having a residence time of about 2–3 minutes. The emerging polymer solution contains approximately 30.0% solids and has a viscosity of 1400 poises at 30° C. The polymer has an intrinsic viscosity of 1.2. To the polymer solution are added a slurry of titanium dioxide in dimethylacetamide and a solution of poly-(N,N-diethyl-beta-aminoethyl methacrylate) in dimethylacetamide such that the final mixture contains 5% of each additive based on the elastomeric solids.

The foregoing mixture is heated to a temperature of 70° C. and is dry spun into a coalesced multifilament of 420 denier having the following properties:

Tenacity at break: 0.72 g.p.d.
Elongation at break: 575%
Tensile stress at 200% elongation: .078 g.p.d.
Tensile recovery: 94%
Stress decay: 20%

EXAMPLE II

The cooled isocyanate-terminated polyether of Example I is added as a 79.8% solution in dimethylacetamide to a mixer containing a solution in dimethylacetamide of 0.124 mol of diethylamine and sufficient hydrazine so that the total hydrazine and diethylamine approximates 3.33 mols. After 3.04 mols of the isocyanate-terminated polyether has been added, the well-agitated mixture is held at about 50° C. for about ten minutes. The intrinsic viscosity of the polymer is 1.0, and the diethylamine added is 4.1 mol percent based on isocyanate-terminated polyether. To the polymer solution is added the mixture of titanium dioxide and poly-(N,N-diethyl-beta-aminoethyl methacrylate) as specified in Example 1.

The above-described preparation of spinning solution is repeated in separate batches, except that 0.248 mol and 0.310 mol of diethylamine are used. The mol percentages of diethylamine for these preparations are 8.2% and 10.2%, respectively.

The three solutions above-described, containing about 33% solids and having a solution viscosity of about 700 poises, are spun separately to give coalesced multifilaments of 280 denier which have the following properties:

|  | Mol percent diethylamine | | |
| --- | --- | --- | --- |
|  | 4.1 | 8.2 | 10.2 |
| Tenacity at break, g.p.d | 0.39 | 0.66 | 0.78 |
| Elongation at break, percent | 676 | 657 | 613 |
| Tensile stress at 200% elongation, g.p.d | .066 | .078 | .084 |
| Tensile recovery, percent | 88.7 | 89.6 | 91.4 |
| Stress decay, percent | 22.5 | 22.1 | 21.6 |

EXAMPLE III

The batch preparations of Example II are repeated, except that the isocyanate-terminated polyether is added as a 78.8% solution in dimethylacetamide until a total of 3.21 mols are added. The solution of hydrazine and diethylamine contains a total of 3.5 mols of solute, of which the diethylamine makes up 0.182, 0.317, and 0.412 mols, respectively. Additives are added as in Example II, and the intrinsic viscosity, solution viscosity, and solids content are the same as in that example. The mol percent of diethylamine is, respectively, 5.7%, 9.9%, and 12.8%, based on the mols of isocyanate-terminated polyether.

Coalesced multifilaments of 280 denier are dry spun from the solutions. The properties of the filaments are as follows:

|  | Mol percent of diethylamine | | |
| --- | --- | --- | --- |
|  | 5.7 | 9.9 | 12.8 |
| Tenacity at break, g.p.d | 0.61 | 0.74 | 0.80 |
| Elongation at break, percent | 651 | 618 | 580 |
| Tensile stress at 200% elongation, g.p.d | .078 | .088 | .095 |
| Tensile recovery, percent | 90.7 | 90.7 | 91.5 |
| Long term tensile recovery, percent | 77.6 | 79.8 | 79.4 |
| Stress decay, percent | 21.6 | 21.3 | 20.6 |
| Long term stress decay, percent | 34.8 | 32.8 | 29.4 |

The yarns are immersed in water at 90° C. for one minute and the following properties are observed:

| Tenacity at break, g.p.d | .095 | .155 | .175 |
| --- | --- | --- | --- |
| Tensile stress at 200% elongation, g.p.d | .053 | .061 | .067 |
| Tensile recovery, percent | 83.8 | 85.6 | 87.8 |
| Stress decay, percent | 13.7 | 12.5 | 12.2 |

Other portions of the polymer solutions are measured for viscosity loss on heating for one minute at 90° C. and on aging for two days at room temperature. Measurements are then made at 30° C.

| Percent loss on heating | 19.5 | 7.3 | 9.0 |
| --- | --- | --- | --- |
| Percent loss on aging | 15.2 | 6.8 | 9.1 |

EXAMPLE IV

A spinning solution of spandex polymer is prepared as described in Example II, except that 2.93 mols of isocyanate-terminated polyether is added as a 77.9% solution in dimethylacetamide to a well-stirred solution of 0.81 mol of diethylamine and 2.61 mols of hydrazine in dimethylacetamide. The mol percent of diethylamine is 27.6%, based on the mols of isocyanate-terminated polyether.

The solution contains 42.3% solids and has a viscosity of 550 poises at 30° C. The polymer has an intrinsic viscosity of 0.76. The solution is dry spun to give coalesced multifilaments of 280 denier which have the following properties:

Tenacity at break: 0.77 g.p.d.
Elongation at break: 587%
Tensile stress at 200% elongation: .094 g.p.d.
Tensile recovery: 91.2%
Long term tensile recovery: 76.8%
Stress decay: 19.8%
Long term stress decay: 29.1%

The filaments are immersed in water at 90° C. for one minute, and the following properties are observed:

Tenacity at break. 0.139 g.p.d.
Tensile stress at 200% elongation: .064 g.p.d.
Tensile recovery: 87.8%
Stress decay: 12.5%

EXAMPLE V

An isocyanate-terminated polyether is prepared as in Example I, but with the following modification: the polytetramethylene ether glycol has a molecular weight of 1800, and it is metered at 17.82 pounds per hour. The p,p'-methylenediphenyl diisocyanate is metered at 4.18 pounds per hour. Average molecular weight of the isocyanate-terminated polyether (macrointermediate) is determined to be 3170 by end-group analysis.

The cooled isocyanate-terminated polyether is diluted to a 28% solution in dimethylacetamide. A total of 0.044 mol of the isocyanate-terminated polyether is used. An extender solution is added to the well-agitated solution and the mixture stirred for an additional five minutes. The extender solution contains the chain extender (ethylenediamine), chain terminator (diethylamine), and dimethylacetamide. Films are cast 17 mils thick and dried overnight. The dried films are heat treated at 150° C. for five minutes and then tested. Properties of films so treated are found to correspond closely to those of filaments obtained by dry spinning in the usual way.

| Mol percent, ethylenediamine | 98 | 95 |
| --- | --- | --- |
| Mol percent, diethylamine | 11 | 22 |
| Intrinsic viscosity of polymer | 1.12 | 0.87 |
| Physical properties of heat-treated films: |  |  |
| Intrinsic viscosity | >2.5 | 1.83 |
| Break elongation, percent | 551 | 586 |
| Tenacity at Break, g.p.d | .48 | .61 |
| $T_{100}$, g.p.e.d | .033 | .037 |
| $T_{200}$, g.p.e.d | .076 | .082 |
| $\pi_{100}$ | 18.2 | 21.6 |

EXAMPLE VI

The batch preparations of Example V are repeated except that the chain extender used is an 80/20 mol percent mixture of ethylenediamine and 1,3-cyclohexylenediamine. Films are treated as in Example V.

| Mol percent, chain extender | 98 | 95 |
| --- | --- | --- |
| Mol percent, diethylamine | 11 | 22 |
| Intrinsic viscosity of polymer | 1.19 | .91 |
| Physical properties of heat-treated films: |  |  |
| Intrinsic viscosity | >2.4 | 1.88 |
| Break elongation, percent | 534 | 633 |
| Tenacity at break, g.p.d | .50 | .55 |
| $T_{100}$, g.p.e.d | .038 | .030 |
| $T_{200}$, g.p.e.d | .078 | .065 |
| $\pi_{100}$ | 20.4 | 19.0 |

EXAMPLE VII

The batch preparation of Example V is repeated, except that the isocyanate-terminated polyether is prepared as in Example I and the chain extender used is m-xylylenediamine. The film is treated as in Example V.

| | |
|---|---:|
| m-Xylylenediamine (mol percent) | 98 |
| Diethylamine (mol percent) | 20 |
| Intrinsic viscosity of polymer | 0.79 |

Physical properties of heat-treated films

| | |
|---|---:|
| Intrinsic viscosity | 1.70 |
| Break elongation, percent | 572 |
| Tenacity at break, g.p.d. | .45 |
| $T_{100}$, g.p.e.d. | .030 |
| $T_{200}$, g.p.e.d. | .056 |
| $\pi_{100}$ | 17.2 |

EXAMPLE VIII

The batch preparations of Example V are repeated, except that the chain extender used is trimethylenediamine. The films are treated as in Example V.

| | | |
|---|---:|---:|
| Mol percent, trimethylenediamine | 98 | 95 |
| Mol percent, diethylamine | 11 | 22 |
| Intrinsic viscosity of polymer | 1.13 | .81 |
| Physical properties for heat-treated films: | | |
| Intrinsic viscosity | 1.7 | 1.4 |
| Break elongation, percent | 652 | 674 |
| Tenacity at break, g.p.d | .42 | .32 |
| $T_{100}$, g.p.e.d | .025 | .022 |
| $T_{200}$, g.p.e.d | .054 | .048 |
| $\pi_{100}$ | 16.3 | 14.9 |

EXAMPLE IX

An isocyanate-terminated polyether is prepared by adding 116.5 g. of p,p'-methylenediphenyl diisocyanate at 45° C. to 500 g. of 1825 molecular weight polytetramethylene ether glycol maintained at 60° C. Heating the mixture 1.5 hours at 90° C. gives a product which is 2.56% NCO. Fifty grams of the cooled isocyanate-terminated polyether is dissolved in 50 g. of dimethylacetamide and chain extended by simultaneously adding a 110° C. solution of 1.34 g. carbohydrazide in 90 g. dimethylacetamide and a room temperature solution of 0.23 ml. diethylamine in 13 g. dimethylacetamide. Films are cast, dried overnight at 50° C., heat treated at 150° C. for five minutes, and boiled off 30 minutes.

| | |
|---|---:|
| Carbohydrazide (mol percent) | 97.7 |
| Diethylamine (mol percent) | 14.7 |
| Intrinsic viscosity of polymer | 1.02 |

Physical properties of heat-treated films

| | |
|---|---:|
| Intrinsic viscosity | 3.69 |
| Break elongation, percent | 512 |
| Tenacity at break, g.p.d. | 0.42 |
| $T_{100}$, g.p.e.d. | .033 |
| $T_{200}$, g.p.e.d. | .068 |
| $\pi_{100}$ | 16.9 |

EXAMPLE X

The procedure for batch preparation of Example V is followed. The chain terminators used are given below. The mole percent of ethylenediamine chain extender is 95 and the mol percent terminator is 22 in all cases. Except where indicated, 6 mol percent of the terminator is added prior to the addition of the extender solution (the remainder of the terminator being added with the extender). Intrinsic viscosities of the polymers range from 0.74 to 0.93. Physical properties of the heat-treated films are tabulated below.

| Terminator | Break elongation | Tenacity at break | $T_{100}$ | $T_{200}$ | $\pi_{100}$ |
|---|---:|---:|---:|---:|---:|
| Diethylamine | 559 | .44 | .031 | .071 | 17.4 |
| Diisopropylamine [1] | 509 | .44 | .035 | .078 | 17.8 |
| Diisopropylamine/diethylamine [2] | 492 | .37 | .033 | .074 | 16.2 |
| Piperidine | 630 | .43 | 0.29 | .065 | 18.2 |
| Ethylenimine | 551 | .60 | .033 | .076 | 18.2 |
| Diethanolamine | 679 | .54 | .029 | .067 | 19.6 |
| Morpholine | 737 | .52 | .027 | .062 | 19.8 |
| 2,6-dimethylmorpholine | 643 | .48 | .029 | .065 | 18.6 |

[1] All of the terminator is added prior to extender.
[2] 11 mol percent of diisopropylamine added prior to extender, 11 mol percent diethylamine added with extender.

The following table shows that with the exception of the first runs in Examples II and III, the amounts of monofunctional chain terminator are within the limits specified hereinabove. The table shows the lower and upper limits permitted by the mathematical expression therefor in mol percent of chain terminator for each intrinsic viscosity listed in the examples, as well as the amount of chain terminator actually used. The appropriate amount of difunctional chain extender corresponding to the amount of chain terminator actually used is calculated from the mathematical expression therefor. This calculated amount of chain extender in mol percent is shown in the table together with the amount of chain extender actually used.

| | | | Chain terminator, mol percent | | | Chain extender, mol percent | |
|---|---:|---:|---:|---:|---:|---:|---:|
| | | | Calculated limits | | | | |
| | $(\eta)$ | $(\eta)^{-2.224}$ | Lower | Upper | Used | Calculated | Used |
| Example: | | | | | | | |
| I | 1.2 | 0.667 | 5.5 | 11.3 | 10 | 95.7 | 96 |
| II | 1.0 | 1.0 | 8.2 | 17 | 4.1 | 104.4 | 105.5 |
| | | | | | 8.2 | 100.3 | 101.3 |
| | | | | | 10.2 | 98.3 | 99.4 |
| III | 1.0 | 1.0 | 8.2 | 17 | 5.7 | 102.8 | 103.2 |
| | | | | | 9.9 | 98.6 | 99.3 |
| | | | | | 12.8 | 95.6 | 96.3 |
| IV | 0.76 | 1.84 | 15.1 | 31.3 | 27.6 | 88.0 | 89.0 |
| V | 1.12 | 0.78 | 8.1 | 16.8 | 11 | 97.4 | 98 |
| | 0.87 | 1.36 | 14.1 | 29.3 | 22 | 92.7 | 95 |
| VI | 1.19 | 0.68 | 7.1 | 14.7 | 11 | 96.3 | 98 |
| | 0.91 | 1.23 | 12.8 | 26.5 | 22 | 91.3 | 95 |
| VII | 0.79 | 1.69 | 13.8 | 28.7 | 20 | 94.2 | 98 |
| VIII | 1.13 | 0.762 | 7.9 | 16.4 | 11 | 97.2 | 98 |
| | 0.81 | 1.60 | 16.6 | 34.5 | 22 | 95.2 | 95 |
| IX | 1.02 | 0.957 | 10.3 | 21.4 | 14.7 | 96.0 | 97.7 |

In the above table it will be noted that the amount of chain extender actually used is substantially equal to the calculated amount. It will also be noted that in the first runs of each of Examples II and III, the amount of chain terminator used lies outside the limits specified. In this connection, it is to be observed that in the first runs of Examples II and III, the products exhibit low tenacity at break as compared to the products from the other runs in which the chain terminator lies within the limits specified. Furthermore, in Example III the first run exhibits significantly poorer viscosity stability on heating and on aging at room temperature.

In carrying out the process of this invention, it will be apparent that a wide variety of ingredients may be used in addition to those previously disclosed in preparing spandex polymers. Other difunctional organic polymers having molecular weight of at least 600, and containing terminal groups which have hydrogen which is reactive with an isocyanate, may be reacted with a molar excess of an organic diisocyanate. These polymers may contain a single type of linkage, such as the ether linkages in the poly(alkylene oxide) glycols or the ester linkages in polyesters, or they may have more than one type of linkage, as in the polyoxythiaalkylene glycols. Even where the linkages are the same, the compositions may be copolymers, such as a copolyester or a copolyether. The polyether, polyetherthioether, polyester, polyurethanes, polyamides, polysulfonamide, polyhydrocarbons, polysiloxanes, and the like, may contain aromatic groups, and they may be substituted with halogen, alkyl, nitro, alkoxy, and similar groups which do not interfere with the subsequent polymerization under the conditions being used. Compounds with the desired combination of high molecular weight and low-melting point, i.e., less than about 60° C., may be obtained by interrupting the structure frequently with side chains or by introducing atoms other than carbon atoms into the main polymer chain, e.g., oxygen, sulfur, nitrogen, and silicon. Specific polyurethanes, polyesters, polyhydrocarbons, polysiloxanes, and polyethers may be prepared as described in U.S. 2,957,852.

A wide variety of organic diisocyanates may be reacted with the difunctional organic polymers. In addition to those heretofore disclosed, m-phenylene diisocyanate and 4-chloro-1,3-phenylene diisocyanate, as well as others, may be used. The diisocyanate may contain other substituents; however, they should be free from groups which are reactive with an isocyanate group.

We claim:

1. In a process for preparing a spandex polymer solution suitable for spinning which comprises reacting a difunctional organic polymer having terminal groups selected from hydroxyl and amine containing hydrogen reactive with an isocyanate group and a molecular weight in the range of about 600 to 5000 with a molar excess of an aromatic diisocyanate and thereafter chain extending the resulting isocyanate-terminated macrointermediate with a difunctional chain extender, the improvement which comprises preparing a solution by dissolving said isocyanate-terminated macrointermediate in an inert organic solvent therefor, and thereafter mixing with said solution a controlled mol percentage of said difunctional chain-extender and a controlled mol percentage of a monofunctional chain-terminator, said monofunctional chain-terminator being mixed with said solution simultaneously with or prior to said difunctional chain extender, the mol percentage of said monofunctional chain-terminator being in the range from about $0.00328 \times M \times (\eta)^{-2.224}$ to about $$0.0068 \times M \times (\eta)^{-2.224}$$

and the mole percentage of said difunctional chain-extender being substantially equal to $100 + (0.0034 \times M \times (\eta)^{-2.224})$ minus said mol percentage of said monofunctional chain-terminator, wherein M is the number-average molecular weight of said isocyanate-terminated macrointermediate, $(\eta)$ is the intrinsic viscosity of the spandex polymer as measured in hexamethylphosphoramide at 25° C. and is in the range from about 0.6 to about 1.3, and said mol percentages are based on the total mols of diisocyanate present in the solution, said difunctional chain extender being a member of the class consisting of diamines, hydrazines, and dihydrazides, said monofunctional compound being a non-aromatic secondary amine.

2. The improvement of claim 1 wherein said difunctional chain-extender is hydrazine.

3. The improvement of claim 1 wherein said difunctional chain-extender is carbohydrazide.

4. The improvement of claim 1 wherein said difunctional chain-extender is a diprimary diamine.

5. The improvement of claim 1 wherein said difunctional chain-extender is a member of the group consisting of ethylenediamine, trimethylenediamine, tetramethylenediamine, metaxylylenediamine, 1,3-cyclohexylenediamine, and mixtures of ethylenediamine and 1,3-cyclohexylenediamine.

6. The improvement of claim 1 wherein said monofunctional chain-terminator is a member of the group consisting of diethylamine, diisopropylamine, tert-butylethylamine, cyclohexylethylamine, piperidine, N - methylpiperazine, ethyleneimine, diethanolamine, di-n-propylamine, di-isobutylamine, di-n-butylamine, dicyclohexylamine, N-tert-butylethanolamine, morpholine, 2,6 - dimethylmorpholine and iminodiacetonitrile.

7. The improvement of claim 5 wherein said monofunctional chain-terminator is a member of the group consisting of diethylamine, diisopropylamine, tert-butylethylamine, cyclohexylethylamine, piperidine, N - methylpiperazine, ethyleneimine, diethanolamine, di-n-propylamine, di-isobutylamine, di-n-butylamine, dicyclohexylamine, N-tert-butylethanolamine, morpholine, 2,6 - dimethylmorpholine and iminodiacetonitrile.

8. The improvement of claim 7 wherein said difunctional organic polymer is a hydroxyl-terminated polyether.

9. The improvement of claim 8 wherein said aromatic diisocyanate is p,p'-methylenediphenyl diisocyanate.

10. The improvement of claim 9 wherein said monofunctional chain-terminator is diethylamine.

11. The improvement of claim 7 wherein the difunctional organic polymer having terminal groups containing hydrogen reactive with an isocyanate group is a member of the group consisting of polyethers, polyesters, polyurethanes, polysulfides, and polysiloxanes, having terminal hydroxyl groups.

References Cited

UNITED STATES PATENTS

| 2,284,896 | 6/1942 | Hanford et al. | 260—2 |
| 2,957,852 | 10/1960 | Frankenburg et al. | 260—75 |
| 2,983,702 | 5/1961 | Little et al. | 260—45.4 |
| 2,999,839 | 9/1961 | Arvidson et al. | 260—45.9 |
| 3,077,006 | 10/1961 | Ibrahim | 19—.48 |
| 3,149,998 | 10/1964 | Thurmaier | 117—138.8 |
| 3,184,426 | 5/1965 | Thoma et al. | 260—30.8 |

OTHER REFERENCES

Knox, Continuous Preparation of Urethane Foam Prepolymer, E. I. du Pont de Nemours & Co., Inc., Wilmington, Del., 1958, p. 8.

Billmeyer, Textbook of Polymer Chemistry, Interscience, New York, 1957, pp. 128–131.

DONALD E. CZAJA, Primary Examiner

H. S. COCKERAM, Assistant Examiner

U.S. Cl. X.R.

260—46.5, 75, 77.5, 78, 79